United States Patent
Wilkins et al.

(10) Patent No.: US 10,204,053 B2
(45) Date of Patent: Feb. 12, 2019

(54) MODELING PROCESSOR SHARED MEMORY USING A CACHEABILITY STATUS

(71) Applicant: Oracle International Corporation, Redwood Shores, CA (US)

(72) Inventors: David Michael Wilkins, Redwood City, CA (US); James Anthony Quigley, Dublin (IE)

(73) Assignee: Oracle International Corporation, Redwood Shores, CA (US)

( * ) Notice: Subject to any disclaimer, the term of this patent is extended or adjusted under 35 U.S.C. 154(b) by 228 days.

(21) Appl. No.: 15/282,930

(22) Filed: Sep. 30, 2016

(65) Prior Publication Data

US 2018/0095882 A1 Apr. 5, 2018

(51) Int. Cl.
  G06F 12/00 (2006.01)
  G06F 12/084 (2016.01)
  G06F 12/0888 (2016.01)
  H04L 29/12 (2006.01)

(52) U.S. Cl.
  CPC ........ G06F 12/084 (2013.01); G06F 12/0888 (2013.01); G06F 2212/1008 (2013.01); G06F 2212/1044 (2013.01); H04L 61/103 (2013.01); H04L 61/2038 (2013.01)

(58) Field of Classification Search
  CPC .............. G06F 12/084; G06F 12/0888; G06F 2212/1008; G06F 2212/1044; H04L 61/103; H04L 61/2038; H04L 61/2076; H04L 61/6022; H04L 43/0894; H04L 47/00
  USPC .......................................................... 711/146
  See application file for complete search history.

(56) References Cited

U.S. PATENT DOCUMENTS

| | | | | |
|---|---|---|---|---|
| 2008/0229020 | A1* | 9/2008 | Plamondon | G06F 12/0813 711/122 |
| 2012/0284461 | A1* | 11/2012 | Larin | G06F 9/30149 711/125 |
| 2014/0089598 | A1* | 3/2014 | DeBruyne | G06F 9/30149 711/140 |
| 2014/0282514 | A1* | 9/2014 | Carson | G06F 9/45533 718/1 |
| 2018/0095882 | A1* | 4/2018 | Wilkins | G06F 12/0815 |

OTHER PUBLICATIONS

Bruce Wile, "Coherent Accelerator Processor Interface (CAPI) for POWER8 Systems—White Paper"; IBM Systems and Technology Group; Advance; Sep. 29, 2014 (13 pages).

Basant Vinaik et al., "Oracle's Sonoma Processor: Advanced Low-cost SPARC Processor for Enterprise Workloads"; HotChips; Aug. 24-27, 2015 (23 pages).

* cited by examiner

*Primary Examiner* — Mardochee Chery
(74) *Attorney, Agent, or Firm* — Ferguson Braswell Fraser Kubasta PC

(57) ABSTRACT

A method may include assigning a cacheability status to a page. The page may be in a memory of a host computer communicatively connected to a processor core on a field-programmable gate array (FPGA). The FPGA may include one or more caches. The method may further include obtaining an instruction including a reference to the page, determining, based on the cacheability status, whether the page is non-cacheable, and resolving the reference to the page, based on determining that the page is non-cacheable, bypassing the one or more caches of the FPGA.

20 Claims, 8 Drawing Sheets

MODELING PROCESSOR SHARED MEMORY USING A CACHEABILITY STATUS

BACKGROUND

Field-programmable gate arrays (FPGAs) may be used to prototype and evaluate the performance of new processor cores that perform complex server tasks, where the FPGA may be an add-in card in a host computer. That is, prior to actually creating a new processor core in hardware, it may be advantageous to simulate the processor core with an FPGA that is connected to the host computer. Connecting the FPGA to the host computer uses common bus interfaces and protocols, such as PCI-e, HyperTransport, etc. However, a shortcoming of such interfaces and protocols (which are usually based on a serial message-passing architecture) is that there is no support for shared memory. Shared memory is an important feature of virtually all modern microprocessors, and without the ability to model or evaluate shared memory with the FPGA, all shared memory testing must be deferred until a much later date, once the proposed CPU design is actually created in hardware. This can create costly delays in testing shared memory features of the processor design, such as whether cache coherence is maintained among the various caches used by the processor. For example, FPGA caches are not snooped (e.g., to obtain a modified copy of a cache entry) by host computer caches across a PCI-e interface.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including assigning a cacheability status to a page. The page is in a memory of a host computer communicatively connected to a processor core on a field-programmable gate array (FPGA). The FPGA includes one or more caches. The method further includes obtaining an instruction including a reference to the page, determining, based on the cacheability status, whether the page is non-cacheable, and resolving the reference to the page, based on determining that the page is non-cacheable, bypassing the one or more caches of the FPGA.

In general, in one aspect, one or more embodiments relate to a system including a host computer and a field-programmable gate array (FPGA) including a processor core and one or more caches. The processor core is communicatively connected to the host computer. The processor core is configured to assign a cacheability status to a page. The page is in a memory of the host computer. The processor core is further configured to obtain an instruction including a reference to the page, determine, based on the cacheability status, whether the page is non-cacheable, and resolve the reference to the page, based on determining that the page is non-cacheable, bypassing the one or more caches of the FPGA.

In general, in one aspect, one or more embodiments of the invention relate to a non-transitory computer readable medium including instructions that, when executed by a processor, perform a method including assigning a cacheability status to a page. The page is in a memory of a host computer communicatively connected to a processor core on a field-programmable gate array (FPGA). The FPGA includes one or more caches. The method further includes obtaining an instruction including a reference to the page, determining, based on the cacheability status, whether the page is non-cacheable, and resolving the reference to the page, based on determining that the page is non-cacheable, bypassing the one or more caches of the FPGA.

Other aspects of the invention will be apparent from the following description and the appended claims.

DETAILED DESCRIPTION

Figure 1A:
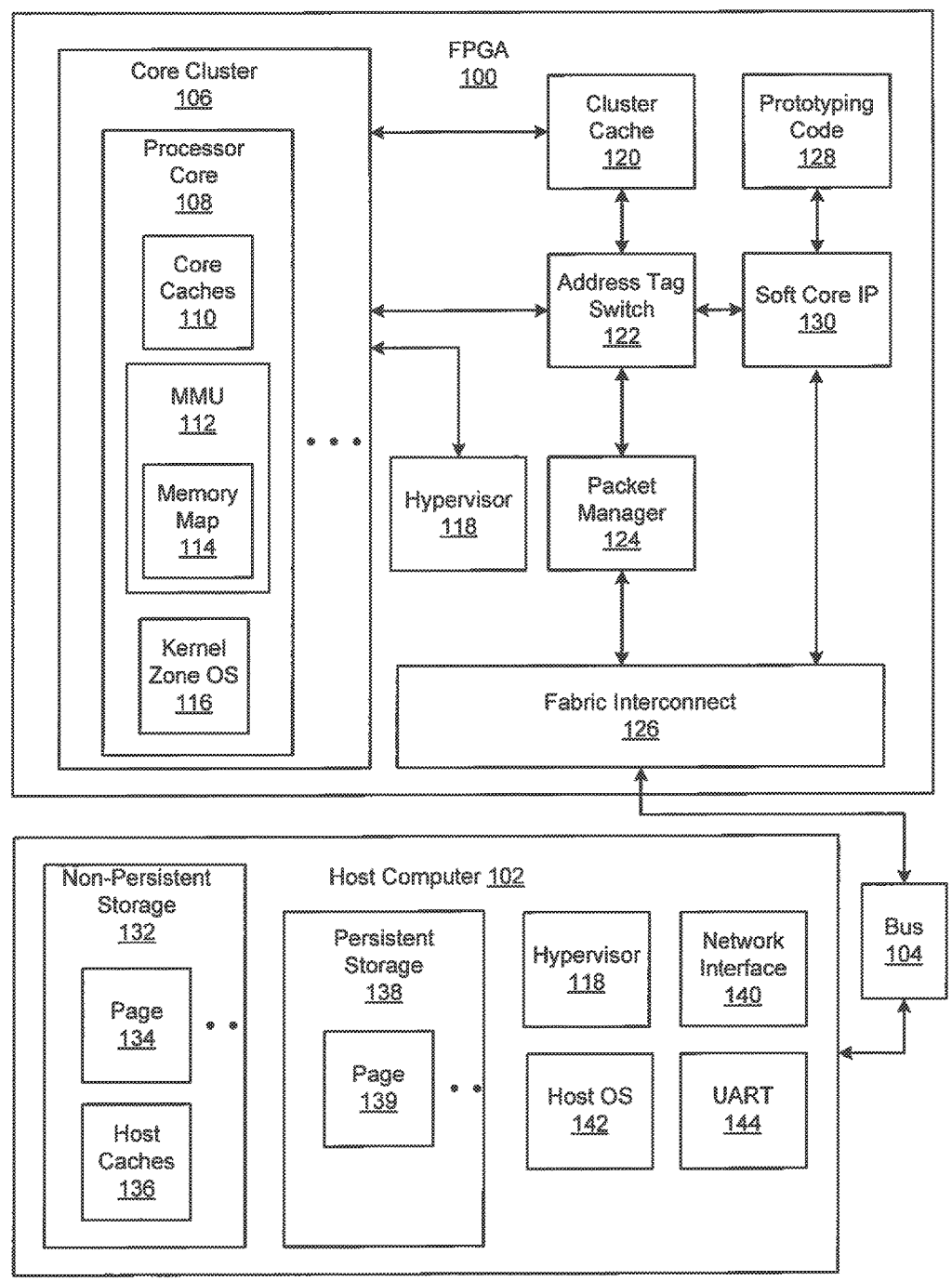
FIG. 1A and FIG. 1B show systems in accordance with one or more embodiments disclosed herein.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method, system and non-transitory computer readable medium for sharing memory between an FPGA and a host computer. In particular, one or more embodiments are directed to a method that uses programmed input/output (PIO) transactions to effect memory sharing between the FPGA and the host computer, such that instructions executing on a processor core modeled in the FPGA may reference an input/output address space of the host computer when performing data transfers to or from the host computer. That is, FPGA-modeled processor cores may directly access and coherently share portions of host computer memory, even across an interface that does not support coherent shared memory. For example, the input/output address space of the host computer (or an unused address space of the host computer) may be treated as non-cacheable (i.e., shared) memory by the FPGA, while the memory address space of the host computer may be treated as cacheable by the FPGA. Software virtualization techniques (e.g., kernel zones) may be used to help model the interface between the processor cores of the FPGA and the host computer, enabling developers to run programs on virtual hardware.

A page in the memory of the host computer may be designated as non-cacheable (e.g., based on the intended use of the page), so that when the FPGA accesses the page, the caches resident on the FPGA are bypassed, thereby avoiding the problem of maintaining cache coherence between the caches of the FPGA and the memory of the host computer. Each processor core in the FPGA may therefore have coherent, shared access to the memory of the host computer, such that updates to the host memory are immediately accessible to each processor core in the FPGA, despite the lack of support for cache coherence by the underlying bus interface.

One or more embodiments are directed to an architecture implemented in an FPGA that enables a new processor design inside a virtual domain to be used by software developers prior to actually building the new processor core, where the memory of the host computer may be shared by the FPGA without the interference of any caches resident on the FPGA. Elements of the architecture provide different pathways to access non-cacheable memory and cacheable memory. Memory accesses may be routed (e.g., by hardware elements of the FPGA) to either the non-cacheable or cacheable pathway.

FIG. 1A shows a system in accordance with one or more embodiments of the invention. As shown in FIG. 1A, the system includes an FPGA (100), a host computer (102), and a bus (104). The FPGA (100) is an integrated circuit designed to be "field-programmable", that is, configured by a customer or designer after manufacturing. The FPGA configuration may be specified using a hardware description language (e.g., VHDL, Verilog). An FPGA (100) may include an array of programmable logic blocks that may be connected via reconfigurable interconnects.

In one or more embodiments, the FPGA (100) may be configured to include a core cluster (106). The core cluster (106) may include one or more processor cores (108). The core cluster (106) may include additional hardware resources adapted for use with one or more individual processor cores (108). The processor cores (108) may be interfaced for enhanced performance and/or more efficient processing of multiple tasks and threads. In one or more embodiments, the processor cores (108) may be the computer processors (502) described with respect to FIG. 5A and the accompanying description below. In one or more embodiments, the bus (104) may be communication interface (512) described with respect to FIG. 5A. Communication between the FPGA (100) and the host computer (102) may occur via packets transmitted across the bus (104) in compliance with a protocol (e.g., PCI-e, HyperTransport).

In one or more embodiments, the host computer (102) may be the computing system (500) described with respect to FIG. 5A and the accompanying description below, or may be the client device (526) described with respect to FIG. 5B. The host computer (102) may include non-persistent storage (132), persistent storage (138), a network interface (140), a host operating system (OS) (142), a hypervisor (118), and a universal asynchronous receiver/transmitter (UART) (144). In one or more embodiments, the non-persistent storage (132) may be non-persistent storage (504) in FIG. 5A, the persistent storage (138) may be persistent storage (506) in FIG. 5A, and the network interface (140) may be communication interface (512) in FIG. 5A. In one or more embodiments, the non-persistent storage (132) may be divided into pages (134), and the persistent storage (138) may be divided into pages (139). The non-persistent storage (132) may include host caches (136).

Continuing with FIG. 1A, each processor core (108) may include core caches (110), a memory management unit (MMU) (112), and a kernel zone operating system (OS) (116). In one or more embodiments of the invention, a cache (e.g., core caches (110), cluster cache (120), host caches (136)) is a type of memory that temporarily stores data that may be used again by a processor (e.g., by a processor core (108)). In one or more embodiments of the invention, caches (110, 120, 136) generally include functionality to reduce the average time for a processor to access data by storing data that has been previously used by the processor. As an example, a cache may operate faster than other computing device memories (e.g., persistent storage (138)) and/or be physically located closer to a processor than other computing device memories. In one or more embodiments of the invention, a processor may check a cache (110, 120, 136) for requested data. If the cache includes the requested data, the data may be provided to the processor (i.e., a cache hit occurs). If the cache does not include the requested data (i.e., a cache miss), then the cache may retrieve the data from memory or from another cache. In one or more embodiments of the invention, if a processor modifies data stored in a cache (e.g., creating a "dirty" cache line), then, using a write-back policy, the data may be written back to memory and/or another cache sometime later, and other caches may be notified so that any copies of the data in those caches may be invalidated.

In one or more embodiments, core caches (110) may be private to a processor core (108). In contrast, the cluster cache (120) may be shared among multiple processor cores (108) in the core cluster (106). In one or more embodiments, the core caches (110) and cluster cache (120) may be arranged in a hierarchy, with higher level caches (e.g., cluster cache (120)) having increased latency compared with lower level caches (e.g., core caches (110)). In one or more embodiments of the invention, although not shown in FIG. 1A, caches (110, 120, 136) may include and/or be operatively connected to one or more cache controllers. In one or more embodiments, the core caches (110) of a processor core (108) may include an instruction cache. In one or more embodiments, contents of a page (134, 139) of the host computer (102) may be cached in the FPGA (100) (e.g., in the cluster cache (120) and/or core caches (110)). For example, data corresponding to a page (134, 139) of the host computer (102) may be stored in a cache of the FPGA (100) until the data is evicted from the cache (e.g., according to a cache eviction algorithm), and written back to the host computer (102) (e.g., in non-persistent storage (132)).

Continuing with FIG. 1A, the MMU (112) may be implemented in hardware (i.e., circuitry), software, or any combination thereof. In one or more embodiments, the MMU (112) may use a memory map (114) to translate a virtual address of a page (134, 139) into a physical address of the page (134, 139)).

Figure 1B:
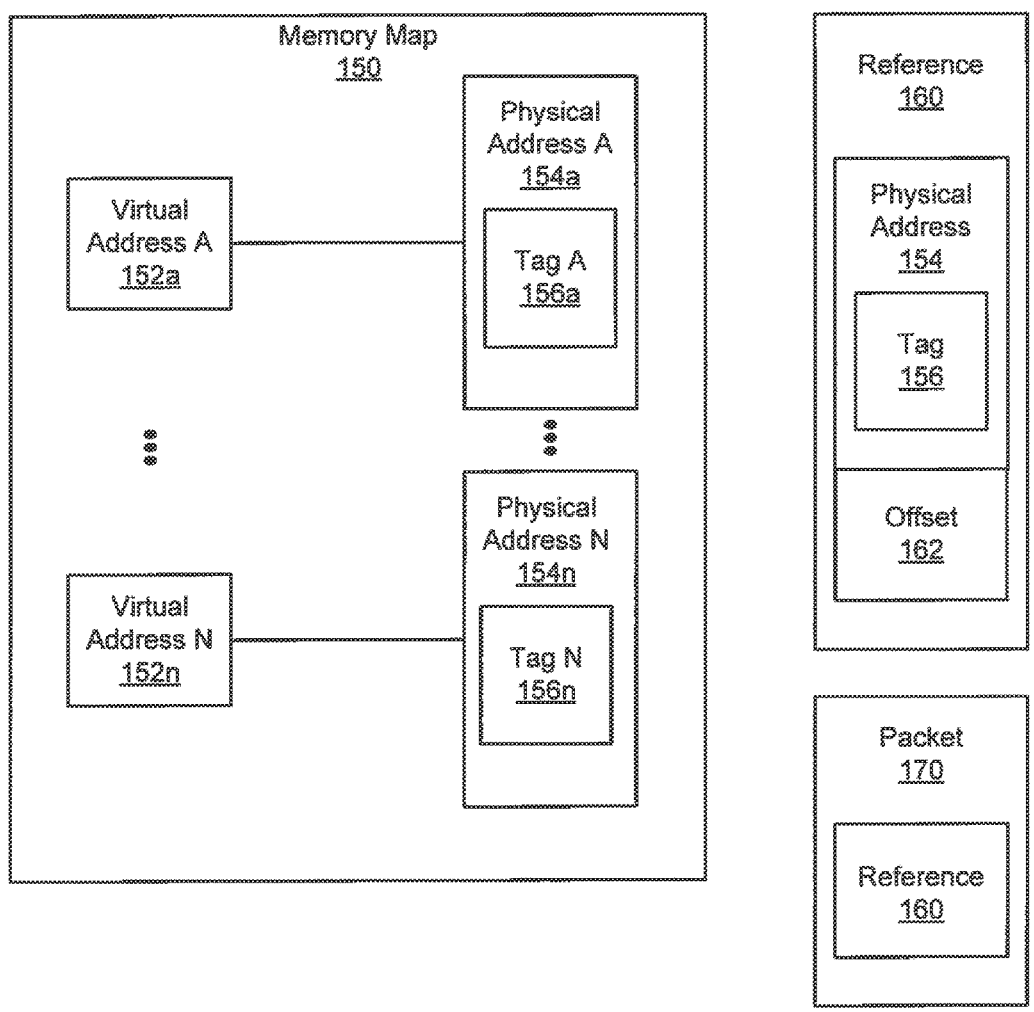

FIG. 1B shows a memory map (150) in accordance with one or more embodiments of the invention. Each entry in the memory map (150) maps a virtual address (152a-152n) of a page (e.g., a virtual page number) to a physical address (154a-154n) of the page (e.g., a starting location of the page in non-persistent storage (132)). In one or more embodiments, the memory map (150) may include additional information about the page (e.g., which host caches (136) of the host computer (102) may be used to store data corresponding to the page).

In one or more embodiments, a portion of the physical address (154a-154n) may be a tag (156a-156n) indicating a cacheability status of the corresponding page. The cacheability status may indicate whether the page is "cacheable" or "non-cacheable". The tag (156a-156n) may be a subset of the bits of the physical address (154a-154n) such that the value of the subset of bits may be interpreted as a cacheability status of "cacheable" or "non-cacheable". In one or more embodiments, the tag (156a-156n) may consist of one or more of the most significant bits (MSBs) of the physical address (154a-154n). For example, a tag (156a-156n) may be the MSB of the physical address (154a-154n) such that when the MSB has a value of "1" the cacheability status is "cacheable" and when the MSB has a value of "0" the cacheability status is "non-cacheable". In one or more embodiments, the caches of the FPGA may be bypassed when resolving a physical address (154a-154n) that includes a tag (156a-156n) indicating that the cacheability status of the corresponding page is "non-cacheable". That is, a physical address (154a-154n) corresponding to a non-cacheable page may be resolved to a physical address (154a-154n) of the host computer (e.g., in non-persistent storage (132) in FIG. 1A) without checking whether the physical address (154a-154n) has been cached in the FPGA. In one or more embodiments, the tag (156a-156n) may function as a flag that indicates whether to bypass the caches of the FPGA (100) during resolution of a physical address (154a-154n).

In one or more embodiments, the tag (156a-156n) may indicate a cacheability status other than "cacheable" or "non-cacheable". For example, the tag (156a-156n) may indicate a conditional cacheability status that depends on one or more contextual factors pertaining to the state of the FPGA (100) and/or the host computer (102).

In one or more embodiments, the tag (156a-156n) may correspond to an address space of the host computer (102). For example, the address space may be a memory address space (e.g., associated with a range of locations in persistent storage (138) and/or non-persistent storage (132)), or an input/output address space (e.g., associated with a range of locations in an input/output device or networking device). Alternatively, the address space may be an unused address space. For example, the address space supported by the host computer (102) may be very large (e.g., a 64-bit address space) such that the address space includes unused portions, where each unused portion corresponds to a specific configuration of one or more bits of a physical address (154a-154n).

Continuing with FIG. 1A, in one or more embodiments, the kernel zone OS (116) may implement a virtual machine on a processor core (108). A virtual machine is a software implementation of a computing device executing on an underlying computing device (e.g., the processor core (108)). In one or more embodiments, the virtual machine may run as a process executed by the processor core (108). The kernel zone OS (116) may run one or more application programs developed for the processor core (108).

In one or more embodiments, the FPGA (100) may be configured to include a hypervisor (118). The hypervisor (118) may initiate and/or monitor the execution of one or more kernel zone operating systems (116) executing on one or more processor cores (108). In one or more embodiments, the hypervisor (118) may also execute on the host computer (102). The hypervisor (118) executing on the host computer (102) may communicate with the kernel zone OS (116) across the bus (104) connecting the FPGA (100) and the host computer (102). For example, the hypervisor (118) executing on the host computer (102) may manage the kernel zone OS (116) as a non-global zone of the host computer (102).

Returning to FIG. 1B, in one or more embodiments, an instruction to be executed on a processor core (108) (e.g., issued by the prototyping code (128), soft core intellectual property (IP) (130), or an application program run by the kernel zone OS (116)) may include a reference (160) to a location in a page. That is, the instruction may specify that data is to be stored at, or loaded from the location. As shown in FIG. 1B, the reference (160) may include the physical address (154) and an offset (162). For example, the physical address (154) may be a starting address of the page in non-persistent storage (132) and the offset (162) may indicate a number of bytes to be added to the physical address (154) in order to obtain the location corresponding to the reference (160). The physical address (154) may include a tag (156) that indicates the cacheability status of the page.

In one or more embodiments, the reference (160) may be resolved using different paths through the hardware components of the FPGA, depending on whether the cacheability status of the page is "cacheable" or "non-cacheable". As discussed above, the caches of the FPGA may be bypassed when the cacheability status of the page (134, 139) is "non-cacheable".

The FPGA (100) may be further configured to include an address tag switch (122). The address tag switch (122) may be implemented in hardware (i.e., circuitry), software, or any combination thereof. The address tag switch (122) may include functionality to "intercept" a reference (160) and determine whether the page (134, 139) containing the reference (160) has a cacheability status of "cacheable" or "non-cacheable" based on a value of a tag (156) in the physical address (154) of the reference (160). Based on that determination, the address tag switch (122) may resolve the reference (160) using the caches of the FPGA (100) or by bypassing the caches of the FPGA (100) and sending a packet (170) that includes the reference (160) to the host computer (102) via the bus (104) (e.g., in compliance with a communication protocol supported by the bus (104)). In one or more embodiments, the address tag switch (122) may resolve the reference (160) without the intervention or knowledge of the hypervisor (118) or the kernel zone OS (116). The address tag switch (122) may include functionality to store data received from the host computer (102) in a cache of the FPGA (100).

The FPGA (100) may be further configured to include a packet manager (124). The packet manager (124) may be implemented in hardware (i.e., circuitry), software, or any combination thereof The packet manager (124) may include functionality to generate and modify packets to be sent (e.g., to the host computer (102)) via the bus (104). For example, the packet manager (124) may generate a packet (170) that includes a reference (160) to a page (134, 139) of the host computer (102). The packet manager (124) may include functionality to process packets received from the bus (104).

The packet manager (124) may include functionality to detect that a packet (170) contains kernel zone traffic, or communication between the kernel zone OS (116) of the FPGA (100) and the hypervisor (118) of the host computer (102). That is, a specific configuration of bits of the physical address (154) (e.g., a configuration of unused bits) in a reference (160) in a packet (170) may indicate the presence of kernel zone traffic. For example, kernel zone traffic may include instructions for attaching the kernel zone OS (116) to the parent virtual domain implemented by the hypervisor (118) executing on the host computer (102). In addition, the cacheability status of a page (134, 139) may be assigned by the hypervisor (118) executing on the host computer (102) via kernel zone traffic.

In one or more embodiments, the packet manager (124) may include functionality to modify the tag (156) of the physical address (154) in the reference (160) prior to sending the packet (170) to the host computer (102), in order to indicate that the page has a cacheability status of "cacheable". For example, the non-cacheable setting of the tag (156) in the reference (160) may correspond to an input/output address space (or unused address space) of the host computer (102), in which case it may be necessary to modify the tag (156) prior to sending the packet (170) so that the reference (160) corresponds to an address space (e.g., a memory address space) that is actually used by the host computer (102) to address non-persistent (132) storage and/or persistent storage (138). Furthermore, modifying the tag (156) in the packet (170) to indicate that the corresponding page (134, 139) has a cacheability status of "cacheable" permits the host caches (136) to be used (e.g., to obtain the performance benefits of caching on the host computer (102)).

The packet manager (124) may include functionality to adjust a packet (170) to account for differences in the size (i.e., number of bits) of the physical address (156) of a reference (160) in a packet (170) relative to a packet size required by a communication protocol (e.g., PCI-e) of the bus (104). For example, the communication protocol used by the bus (104) may require that the packet (170) contain additional data and/or that the data in the packet (170) be arranged in a specific format. That is, the packet manager (124) may adjust the alignment, merging and/or division of data within a packet (170) to comply with the requirements of the communication protocol used by the bus (104). In one or more embodiments, the packet manager (124) may include functionality to provide byte enable signals indicating how specific bytes of data in the packet (170) are to be read or written by the recipient (i.e., the host computer (102)).

The FPGA (100) may be further configured to include a fabric interconnect (126). The fabric interconnect (126) may be implemented in hardware (i.e., circuitry), software, or any combination thereof The fabric interconnect (126) may be a networking switch that includes functionality to connect the FPGA (100) to a network or bus (104). The fabric interconnect (126) may include functionality to send packets (170) to the bus (104) and receive packets (170) from the bus (104).

The FPGA (100) may be further configured to include prototyping code (128). The prototyping code (128) may be implemented in hardware (i.e., circuitry), software, or any combination thereof The prototyping code (128) may be used to prototype, test, debug and evaluate a processor core design prior to actually building and deploying multiple processor cores (108). For example, a multi-processor or system-on-chip (SoC) may include many processor cores (108) that implement various server tasks that may be difficult to debug unless the individual processor cores (108) have been thoroughly debugged. These server tasks may involve input/output, interfacing with memory and networks, booting up a server using a host console, etc.

The FPGA (100) may be further configured to include soft core intellectual property (IP) (130). The soft core IP (130) may be implemented in hardware (i.e., circuitry), software, or any combination thereof The soft core IP (130) may be a previously designed logic block used in configuring the FPGA (100). The soft core IP (130) may be represented using a netlist (i.e., a list of logic gates and interconnections comprising an integrated circuit) or using a hardware description language (HDL) (e.g., VHDL, Verilog). The soft core IP (130) may implement various functions, such as domain specific functions (e.g., digital signal processing) and/or may implement complex systems (e.g., processors, network controllers, PCI-e interfaces).

Continuing with FIG. 1A, the host computer (102) may include a host OS (142). The host OS (142) may be software that manages and controls the hardware and software resources of the host computer (102), and provides basic functions including scheduling tasks, executing application programs, and monitoring and controlling peripheral devices.

The host computer (102) may include a universal asynchronous receiver/transmitter (UART) (144). In one or more embodiments, the UART (144) may be an integrated circuit used for serial communication over a serial port of the host computer (102). The UART (144) may include functionality to translate data between characters and an asynchronous serial communication format that encapsulates those characters between start bits and stop bits. In one or more embodiments, the data format and transmission speeds of the UART (144) may be configurable.

While FIG. 1A and FIG. 1B show configurations of components, other configurations may be used without departing from the scope of the invention. For example, various components may be combined to create a single component. As another example, the functionality performed by a single component may be performed by two or more components.

Figure 2:
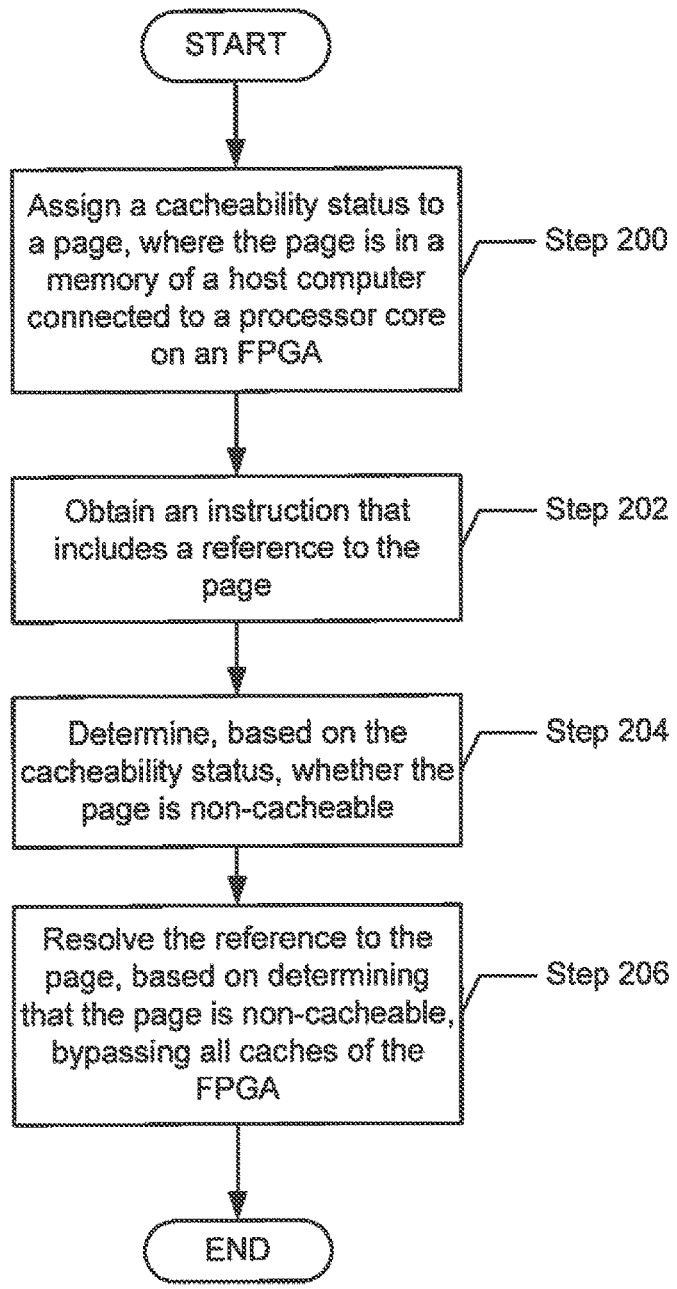
FIG. 2 and FIG. 3 show flowcharts in accordance with one or more embodiments disclosed herein.

FIG. 2 shows a flowchart in accordance with one or more embodiments of the invention. The flowchart depicts a process for sharing a memory. One or more of the steps in FIG. 2 may be performed by the components of the FPGA (100), discussed above in reference to FIG. 1A and FIG. 1B. In one or more embodiments of the invention, one or more of the steps shown in FIG. 2 may be omitted, repeated, and/or performed in parallel, or in a different order than the order shown in FIG. 2. Furthermore, the steps may be performed actively or passively. For example, some steps may be performed using polling or be interrupt driven in accordance with one or more embodiments of the invention. By way of an example, determination steps may not require a processor core to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention. Accordingly, the scope of the invention should not be considered limited to the specific arrangement of steps shown in FIG. 2.

Initially, in Step 200, a cacheability status is assigned to a page in a memory of a host computer communicatively connected to a processor core on an FPGA. In one or more embodiments, the assignment may be performed by a component of the FPGA (e.g., a hypervisor or kernel zone OS). The assignment may be based on the intended use of the page. For example, the assignment may depend on various factors, including: how often the contents of the page will be updated, whether page contents will be accessed via bulk data transfer, how important it is to provide a coherent view of the page's contents, and the importance of speed of access to the page's contents. In one or more embodiments, the assignment may be performed when an address space is defined for a process executing on the processor core, and various pages of memory are mapped (e.g., in a memory map of an MMU of the processor core) for the new process. In one or more embodiments, the new process may correspond to prototyping code, soft core IP, or an application program executed by a kernel zone OS. In one or more embodiments, a page assigned a cacheability status of "non-cacheable" may not be cached using any of the caches of the FPGA (e.g., only the caches of the host computer may cache the contents of the page). In one or more embodiments, the assigned cacheability status may later be modified (e.g., in order to speed up memory performance, despite losing cache coherence).

One reason for assigning a cacheability status of "non-cacheable" for a page is the difficulty of achieving cache coherence between the caches of the FPGA and the caches of the host computer across a bus that does not support cache coherence. For example, commonly used protocols (e.g., PCI-e) do not support cache update protocols where a cache entry may be pulled from a cache of the FPGA and sent to the host computer. Assigning a cacheability status to a page permits the caches of the FPGA to be bypassed on a page-by-page basis.

In Step 202, an instruction that includes a reference to the page is obtained. For example, an instruction may be obtained from a component of the FPGA (e.g., a kernel zone OS, prototyping code, soft core IP, or an application program). In one or more embodiments, the instruction may specify that data be stored at, or loaded from a location corresponding to the reference. In one or more embodiments, the reference may include the physical address of the page (e.g., a starting address of the page) and an offset (e.g., specifying a number of bytes) into the page.

In Step 204, it is determined, based on the cacheability status, whether the page is non-cacheable. In one or more embodiments, the determination may be performed by a component of the FPGA (e.g., an address tag switch) based on a physical address contained in the reference.

In Step 206, the reference to the page is resolved, based on determining that the page is non-cacheable, bypassing all caches of the FPGA. That is, the contents of the page corresponding to the reference may be accessed directly from the host computer, without any accessing any caches of the FPGA. For example, the page may be accessed from the non-persistent storage (e.g., a cache) of the host computer.

Figure 3:
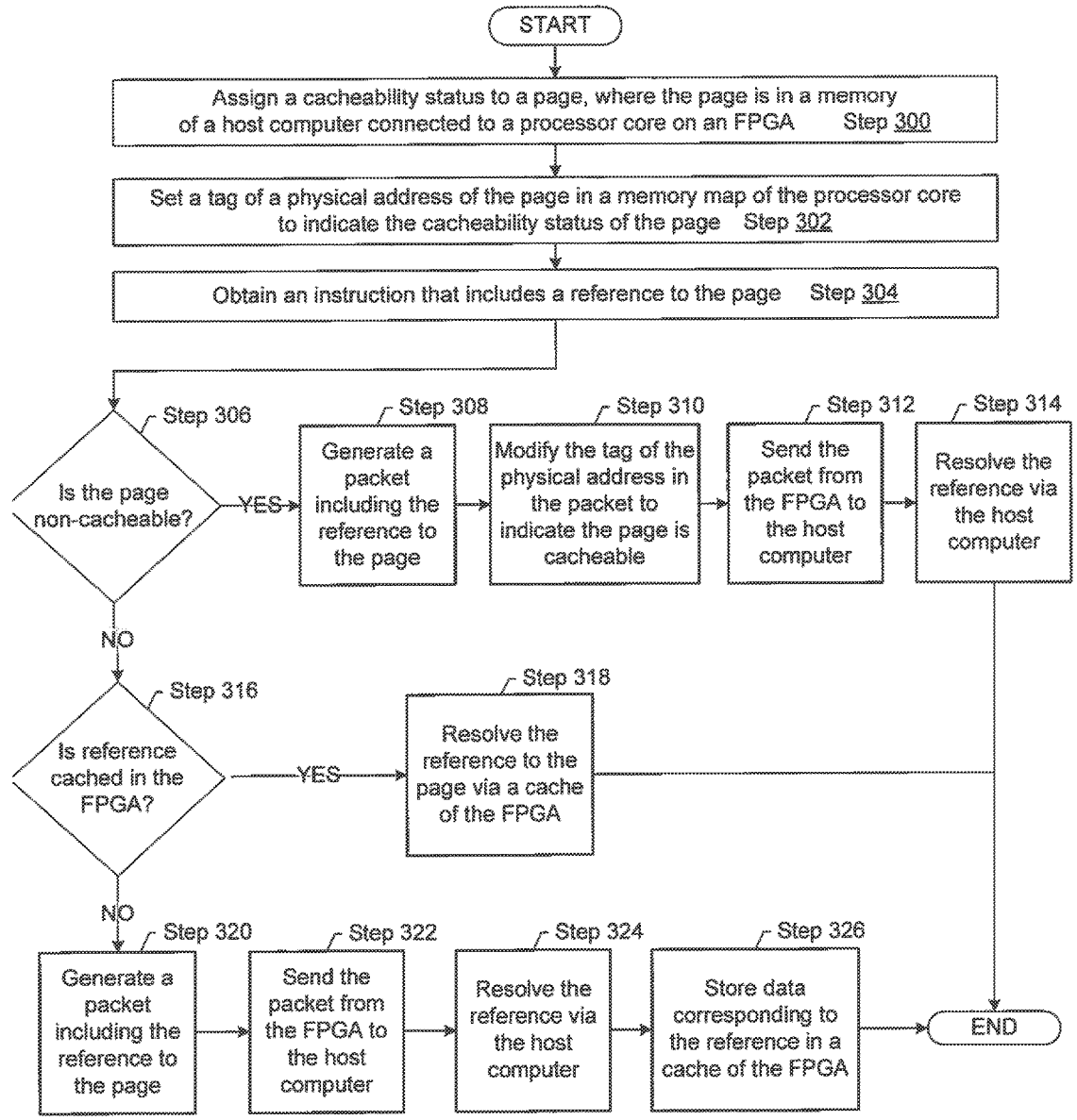

FIG. 3 shows a flowchart in accordance with one or more embodiments of the invention. The flowchart depicts a process for sharing a memory. One or more of the steps in FIG. 3 may be performed by the components of the FPGA (100), discussed above in reference to FIG. 1A. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, in Step 300, a cacheability status is assigned to a page in a memory of a host computer communicatively connected to a processor core on an FPGA, as discussed above in the description of Step 200.

In Step 302, a tag is set in a physical address of the page in a memory map of the processor core to indicate the cacheability status of the page. In one or more embodiments, the memory map may be in an MMU of the processor core. In one or more embodiments, setting the tag may be performed by a component of the FPGA (e.g., a hypervisor or kernel zone OS). In one or more embodiments, the tag may be implemented by setting the value of one or more bits of the physical address (e.g., one or more MSBs of the physical address). In one or more embodiments, a tag that corresponds to a cacheability status of "non-cacheable" may correspond to an input/output address space of the host computer (e.g., an address space that is reserved for input/output devices of the host computer). In one or more embodiments, a tag that corresponds to a cacheability status of "non-cacheable" may correspond to an unused portion of address space of the host computer. A tag that corresponds to a cacheability status of "cacheable" may correspond to a memory address space of the host computer (e.g., an address space that is reserved for non-persistent storage and/or persistent storage of the host computer).

In Step 304, an instruction that includes a reference to the page is obtained, as discussed above in the description of Step 202.

In Step 306, it is determined, based on the cacheability status, whether the page is non-cacheable, as discussed above in the description of Step 204. In one or more embodiments, the determination may be performed by examining the tag in a physical address that references the page (e.g., the physical address referenced in the instruction).

In Step 308, if it is determined that the page is non-cacheable (in Step 306 above), then a packet is generated including the reference to the page. For example, the packet may contain the instruction that references the page. The packet may be generated in compliance with a communication protocol supported by a bus that connects the FPGA with the host computer. For example, the format of the packet may be adjusted to account for differences in the size of the physical address of a reference relative to a packet size required by a communication protocol. These adjustments may include the alignment, merging and/or division of data within a packet. In addition, the packet may be adjusted to include additional data required by the communication protocol. In one or more embodiments, byte enable signals may be provided to indicate how specific bytes of data in the packet are to be read or written by the host computer.

If it is determined in Step 306 that the page is cacheable, then execution continues with Step 316 below.

In Step 310, the tag of the physical address in the packet is modified to indicate that the page is cacheable. There may be several reasons for modifying the tag of the physical address in the packet to indicate that the page is cacheable. For example, the tag may have been set (in Step 302 above) to indicate a cacheability status of "non-cacheable" for the sole purpose of bypassing the caches of the FPGA. For example, the tag may correspond to an unused address space or an input/output address space, and therefore should be modified to correspond to the address space (e.g., a memory address space) that actually corresponds to the page on the host computer. Furthermore, modifying the tag of the physical address in the packet to indicate that the corresponding page is cacheable permits the host caches of the host computer to be used (e.g., to obtain the performance benefits of caching on the host computer).

In Step 312, the packet is sent from the FPGA to the host computer. The packet may be sent across a bus (e.g., in compliance with a protocol supported by the bus) connecting the FPGA and the host computer.

In Step 314, the reference is resolved via the host computer. In one or more embodiments, the host computer may store data into the page (e.g., if the instruction containing the reference is a store instruction). Alternatively, the host computer may retrieve the data at the referenced location(s)

(e.g., if the instruction containing the reference is a load instruction) and return the retrieved data to the FPGA via one or more packets.

In Step 316, it is determined, whether the reference to the page is cached in the FPGA. In one or more embodiments, the caches of the FPGA may include core caches private to the processor core and/or a cluster cache that may be shared by multiple processor cores.

In Step 318, if it is determined that the reference is cached in the FPGA (in Step 316 above), the reference is resolved via a cache of the FPGA. In one or more embodiments, data may be stored into the cache entry corresponding to the reference (e.g., if the instruction containing the reference is a store instruction). Alternatively, data may be retrieved from the entry corresponding to the reference (e.g., if the instruction containing the reference is a load instruction). If it is determined that the reference is not cached in the FPGA (in Step 316 above), then execution continues with Step 320 below.

In Step 320, a packet is generated including the reference to the page, as discussed above in the description of Step 308.

In Step 322, the packet is sent from the FPGA to the host computer, as discussed above in the description of Step 312.

In Step 324, the reference is resolved via the host computer, as discussed above in the description of Step 314.

In Step 326, the data corresponding to the reference is stored in a cache of the FPGA. In one or more embodiments, a new entry may be added to the cache corresponding to the reference. For example, data obtained from the referenced location of the page on the host computer via a load instruction may be stored in a new cache entry corresponding to the reference. Similarly, data written to the referenced location of the page on the host computer via a store instruction may be stored in a new cache entry corresponding to the reference.

Figure 4A:
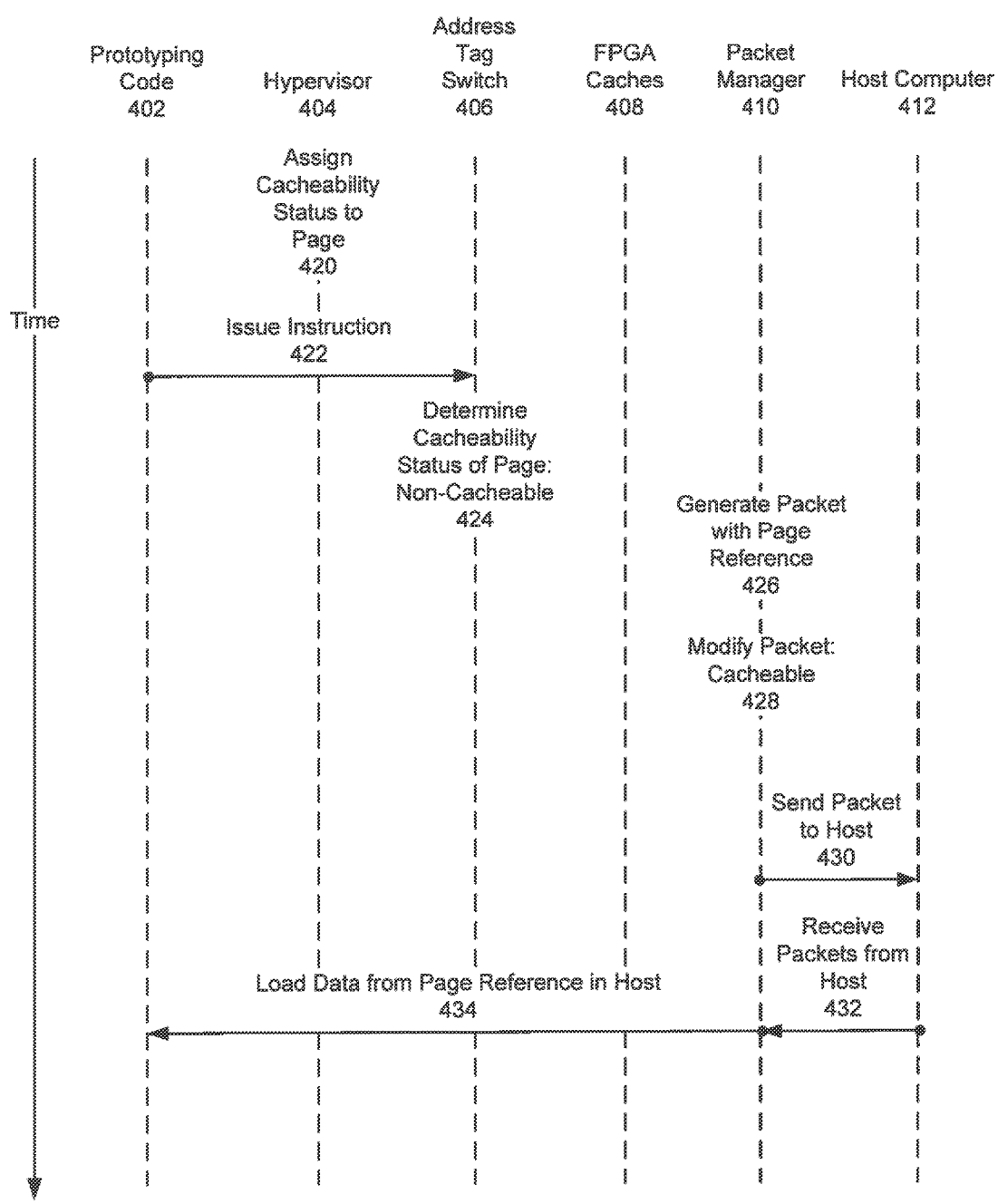
FIG. 4A, FIG. 4B, and FIG. 4C show examples in accordance with one or more embodiments disclosed herein.
Figure 4B:
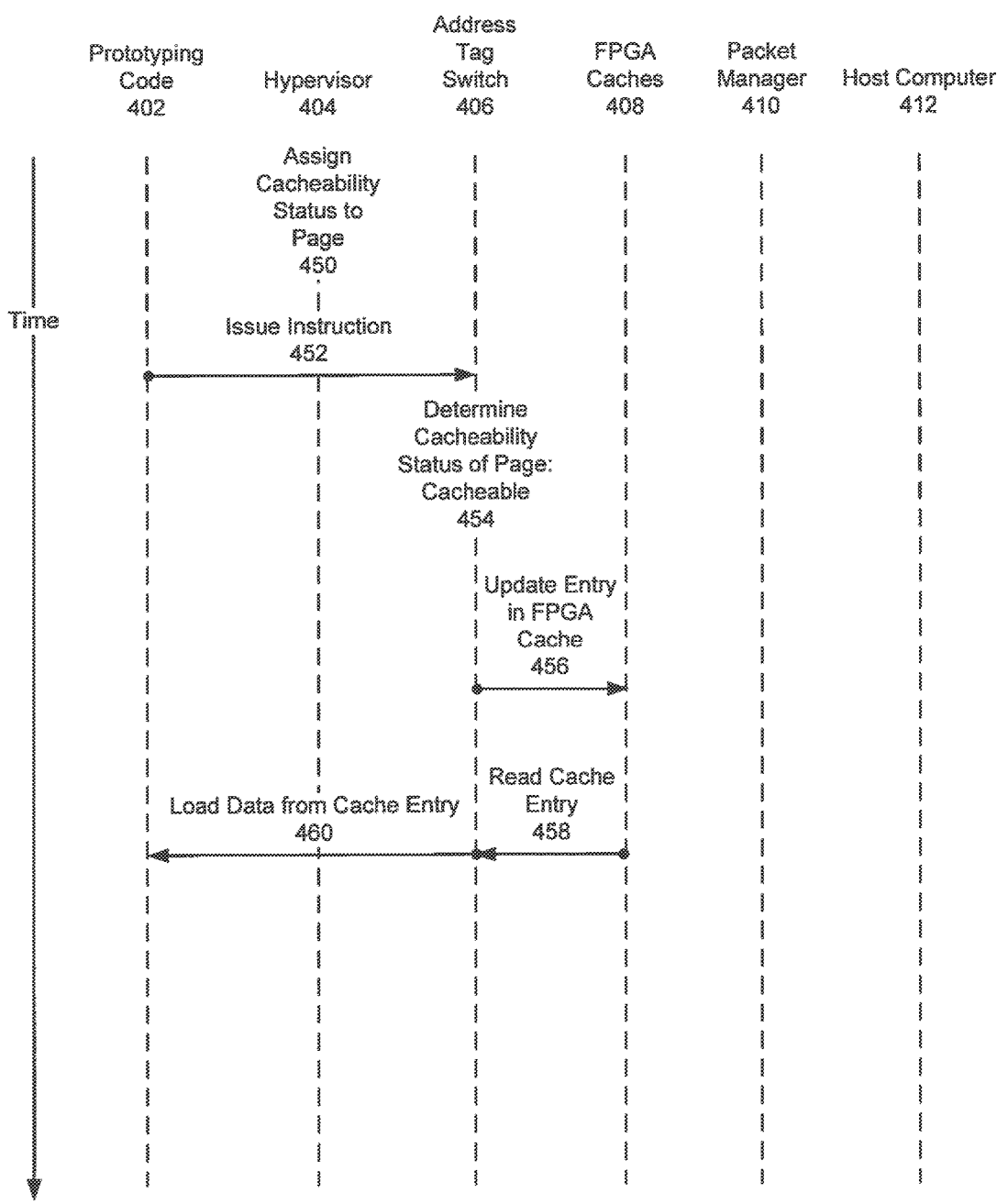
Figure 4C:
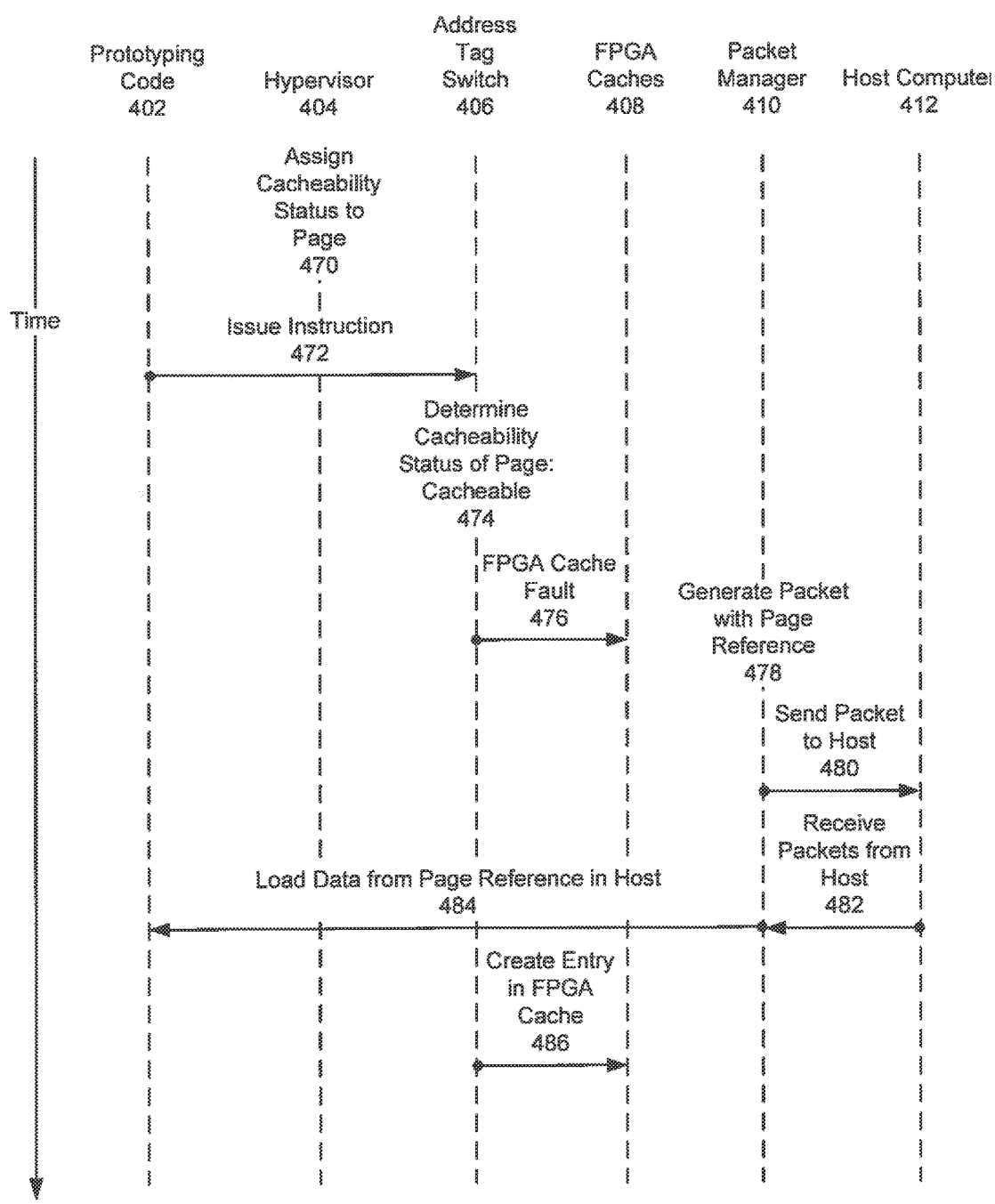

The following implementation example is for explanatory purposes only and not intended to limit the scope of the invention. FIG. 4A, FIG. 4B, and FIG. 4C illustrate, in accordance with one or more embodiments, the relative timing of steps performed by various components of an FPGA in accordance with the flowcharts in FIG. 2 and FIG. 3. These FPGA components include: prototyping code (402) ((128) in FIG. 1A), a hypervisor (404) ((118) in FIG. 1A), an address tag switch (406) ((122) in FIG. 1A), FPGA caches (408) ((110) and (120) in FIG. 1A), and a packet manager (410) ((124) in FIG. 1A). FIG. 4A, FIG. 4B, and FIG. 4C also include a host computer (412) ((102) in FIG. 1A) that is connected via a bus to the FPGA. The prototyping code (402) is aimed at testing and evaluating the performance of a new processor core design implemented in the FPGA, particularly the processor core's interface to shared memory (e.g., the performance of load/store instructions).

The host computer (412) uses a 42-bit address space that is divided into an input/output address space (e.g., for addressing input/output and networking devices of the host computer (412)) and a memory address space (e.g., for addressing non-persistent and persistent storage of the host computer (412)). The input/output address space corresponds to a MSB of "1" and the memory address space corresponds to a MSB of "0". The input/output address space is non-cacheable and the memory address space is cacheable.

Turning to FIG. 4A, in Step 420, a cacheability status of "non-cacheable" is assigned to a page by the hypervisor (404) when a process corresponding to the prototyping code (402) is initialized. The cacheability status is assigned by setting a tag (e.g., of "1") in the MSB of a physical address corresponding to the page in an entry in a memory map of a processor core of the FPGA. The cacheability status of the page is assigned as "non-cacheable" in order to bypass the FPGA caches (408), to ensure a coherent view of the memory of the host computer (412) by the FPGA, and thereby avoid the need to manage the coherence of the FPGA caches (408) relative to the caches of the host computer (412).

In Step 422, the prototyping code (402) issues an instruction containing a reference to the page. The reference consists of the 42-bit physical address of the page and a 13-bit offset into the page. In Step 424, the reference is processed by the address tag switch (406), which determines that the cacheability status of the page is "non-cacheable". Therefore, the reference will be resolved without accessing the FPGA caches (408). Next, in Step 426, the packet manager (410) generates a packet containing the reference to be sent to the host computer (412). However, before the packet is sent, in Step 428, the packet manager (410) modifies the tag in the physical address of the packet to indicate a cacheability status of "cacheable", by setting the MSB of the physical address to "0". This means that the physical address now refers to the memory address space of the host computer (412). When the packet is sent to the host computer (412) in Step 430, the reference resolves to an address in non-persistent storage. In this scenario, it turns out that the reference is already in a cache of the host, so the reference is resolved to the corresponding cache entry. If the instruction is a store instruction, then the corresponding data is written to the location indicated by the reference by the host computer (412). If the instruction is a load instruction, then in Step 432, the data obtained from the location specified by the reference is bundled into one or more packets and sent by the host computer (412) to the FPGA. Finally, in Step 434, the packet manager (410) processes the received packets and returns the data (i.e., the result of the load instruction) to the prototyping code (402).

FIG. 4B shows an alternate scenario in which the page is instead assigned, in Step 450, a cacheability status of "cacheable" by the hypervisor (404). In Step 452, the prototyping code (402) issues an instruction containing a reference to the page. In Step 454, the reference is processed by the address tag switch (406), but unlike the scenario of FIG. 4A, the address tag switch (406) determines that the cacheability status of the page is "cacheable". Therefore, the reference will be resolved by accessing the FPGA caches (408). In Step 456, if the instruction is a store instruction, the address tag switch (406) updates (e.g., with the value to be stored) the entry of an FPGA cache (408) corresponding to the reference. In Step 458, if the instruction is a load instruction, the address tag switch (406) reads the entry of an FPGA cache (408) corresponding to the reference. Finally, in Step 460, the address tag switch (406) returns the data obtained from an FPGA cache (408) (i.e., the result of the load instruction) to the prototyping code (402).

FIG. 4C shows a variation of the scenario of FIG. 4B in which a cache fault occurs. That is, the cache entry corresponding to the reference is not contained within any FPGA cache (408). In Step 470, a cacheability status of "cacheable" is again assigned by the hypervisor (404). In Step 472, the prototyping code (402) again issues an instruction containing a reference to the page. In Step 474, the reference is processed by the address tag switch (406), which again determines that the cacheability status of the page is "cacheable". Therefore, an attempt is again made to resolve the reference by accessing the FPGA caches (408). However, in Step 476, a cache fault occurs because there is no entry in the FPGA caches (408) corresponding to the reference. Therefore, the reference will be resolved by the host computer (412). Next, in Step 478, the packet manager (410) generates a packet containing the reference to be sent to the host computer (412). This time, unlike the scenario of FIG. 4A, the cacheability status of the page is already assigned to be "cacheable", so there is no need to modify the packet (e.g., since the reference already resolves to a location in the memory address space on the host computer (412)).

In Step 480, the packet is sent to the host computer (412). In this scenario, it turns out that the reference resolves to a location in the non-persistent storage of the host computer (412). If the instruction is a load instruction, then in Step 482, the data obtained from the location specified by the reference is bundled into one or more packets and sent by the host computer (412) to the FPGA. In Step 484, the packet manager (410) processes the received packets and returns the data (i.e., the result of the load instruction) to the prototyping code (402). Finally, in Step 486, a new cache entry corresponding to the reference is added to one or more of the FPGA caches (408). For example, the new cache entry contains the value stored at the referenced location if the instruction is a store instruction, or contains the value loaded from the referenced location if the instruction is a load instruction.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
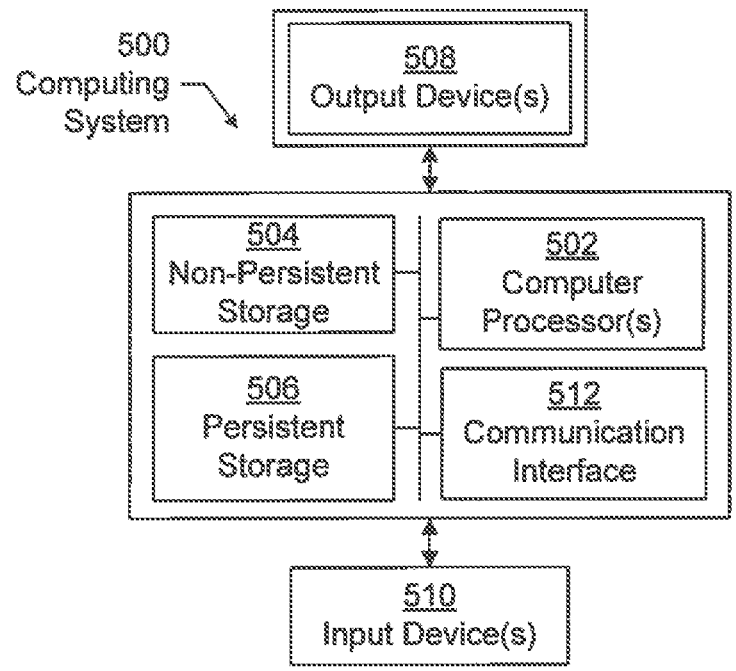
FIG. 5A and FIG. 5B show computing systems in accordance with one or more embodiments disclosed herein.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Figure 5B:
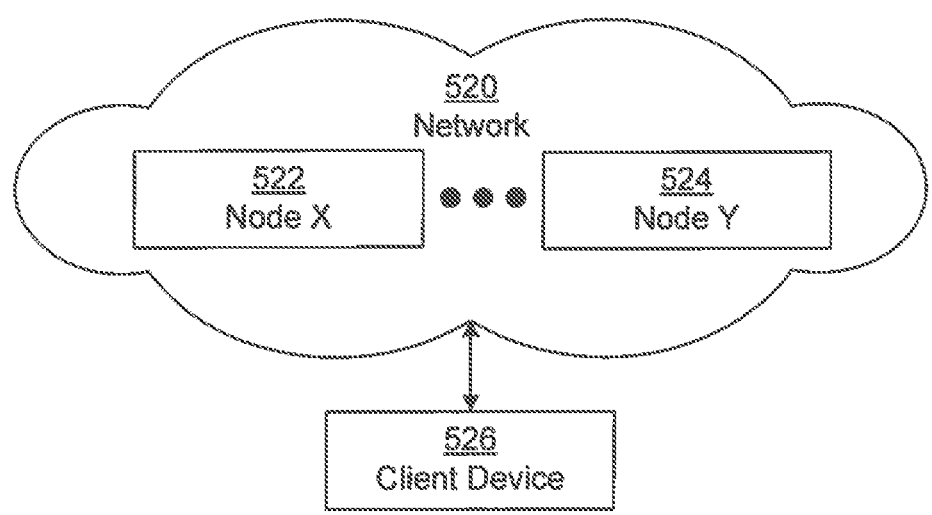

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   assigning a cacheability status to a page, wherein the page is in a memory of a host computer communicatively connected to a processor core on a field-programmable gate array (FPGA), wherein the FPGA comprises one or more caches;
   detecting, based on a physical address in a first packet sent between the host computer and the processor core, communication between a kernel zone operating system (OS) executed by the processor core and a hypervisor executed by the host computer;
   obtaining an instruction comprising a reference to the page;
   determining, based on the cacheability status, whether the page is non-cacheable; and
   resolving the reference to the page, based on determining that the page is non-cacheable, bypassing the one or more caches of the FPGA.

2. The method of claim 1, wherein assigning the cacheability status comprises setting a tag in a physical address of the page in a memory map of the processor core.

3. The method of claim 2, wherein resolving the reference to the page comprises:
   generating a second packet comprising the reference to the page, wherein the reference comprises the physical address of the page and an offset into the page; and
   sending, by the FPGA, the second packet to the host computer.

4. The method of claim 3, further comprising modifying the tag in the physical address in the second packet to obtain a modified tag, wherein the modified tag indicates that the page is cacheable.

5. The method of claim 2, wherein setting the tag of the physical address comprises setting a value of one or more bits in the physical address.

6. The method of claim 1,
   wherein the FPGA detects, based on a configuration of bits in the physical address in the first packet, the communication between the kernel zone OS and the hypervisor.

7. The method of claim 1, wherein assigning the cacheability status is performed by the kernel zone operating system based, in part, on information received from the hypervisor regarding a usage of a device comprising the page.

8. A system, comprising:
   a host computer; and
   a field-programmable gate array (FPGA) comprising a processor core and one or more caches, wherein the processor core is communicatively connected to the host computer, wherein the processor core is configured to:
   assign a cacheability status to a page, wherein the page is in a memory of the host computer;
   detect, based on a physical address in a first packet sent between the host computer and the processor core, communication between a kernel zone operating system (OS) executed by the processor core and a hypervisor executed by the host computer;
   obtain an instruction comprising a reference to the page;
   determine, based on the cacheability status, whether the page is non-cacheable; and
   resolve the reference to the page, based on determining that the page is non-cacheable, bypassing the one or more caches of the FPGA.

9. The system of claim 8, wherein assigning the cacheability status comprises setting a tag in a physical address of the page in a memory map of the processor core.

10. The system of claim 9, wherein resolving the reference to the page comprises:
    generating a second packet comprising the reference to the page, wherein the reference comprises the physical address of the page and an offset into the page; and
    sending, by the FPGA, the second packet to the host computer.

11. The system of claim 10, wherein the processor core is further configured to modify the tag in the physical address in the second packet to obtain a modified tag, wherein the modified tag indicates that the page is cacheable.

12. The system of claim 9, wherein setting the tag of the physical address comprises setting a value of one or more bits in the physical address.

13. The system of claim 8,
wherein the FPGA detects, based on a configuration of bits in the physical address in the first packet, the communication between the kernel zone OS and the hypervisor.

14. The system of claim 8, wherein assigning the cacheability status is performed by the kernel zone operating system based, in part, on information received from the hypervisor regarding the usage of a device comprising the page.

15. A non-transitory computer readable medium comprising instructions that, when executed by a processor, perform a method comprising:
assigning a cacheability status to a page, wherein the page is in a memory of a host computer communicatively connected to a processor core on a field-programmable gate array (FPGA), wherein the FPGA comprises one or more caches;
detecting, based on a physical address in a first packet sent between the host computer and the processor core, communication between a kernel zone operating system (OS) executed by the processor core and a hypervisor executed by the host computer;
obtaining an instruction comprising a reference to the page;
determining, based on the cacheability status, whether the page is non-cacheable; and
resolving the reference to the page, based on determining that the page is non-cacheable, bypassing the one or more caches of the FPGA.

16. The non-transitory computer readable medium of claim 15, wherein assigning the cacheability status comprises setting a tag in a physical address of the page in a memory map of the processor core.

17. The non-transitory computer readable medium of claim 16, wherein resolving the reference to the page comprises:
generating a second packet comprising the reference to the page, wherein the reference comprises the physical address of the page and an offset into the page; and
sending, by the FPGA, the second packet to the host computer.

18. The non-transitory computer readable medium of claim 17, wherein the method further comprises modifying the tag in the physical address in the second packet to obtain a modified tag, wherein the modified tag indicates that the page is cacheable.

19. The non-transitory computer readable medium of claim 16, wherein setting the tag of the physical address comprises setting a value of one or more bits of the physical address.

20. The non-transitory computer readable medium of claim 15,
wherein the FPGA detects, based on a configuration of bits in the physical address in the first packet, the communication between the kernel zone OS and the hypervisor.

* * * * *

UNITED STATES PATENT AND TRADEMARK OFFICE
CERTIFICATE OF CORRECTION

PATENT NO. : 10,204,053 B2
APPLICATION NO. : 15/282930
DATED : February 12, 2019
INVENTOR(S) : Wilkins et al.

Page 1 of 1

It is certified that error appears in the above-identified patent and that said Letters Patent is hereby corrected as shown below:

Column 4, Line 57, delete "139))." and insert -- 139). --, therefor.

Column 6, Line 50, delete "thereof" and insert -- thereof. --, therefor.

Column 7, Line 43, delete "thereof" and insert -- thereof. --, therefor.

Column 7, Line 52, delete "thereof" and insert -- thereof. --, therefor.

Column 7, Line 57, delete "thereof" and insert -- thereof. --, therefor.

Signed and Sealed this
Twenty-first Day of January, 2020

Andrei Iancu
*Director of the United States Patent and Trademark Office*